United States Patent [19]
Leshko

[11] Patent Number: 4,730,210
[45] Date of Patent: Mar. 8, 1988

[54] WIDEBAND ANALOG RGB VIDEO PROCESSOR WITH NEGATIVE FEEDBACK CAPABILITY AND BLACK LEVEL CONTROL

[75] Inventor: Roman W. Leshko, Chicago, Ill.

[73] Assignee: Zenith Electronics Corporation, Glenview, Ill.

[21] Appl. No.: 765,888

[22] Filed: Aug. 14, 1985

[51] Int. Cl.$^4$ .................................................. H04N 9/72
[52] U.S. Cl. ........................................ 358/34; 358/74; 358/172; 358/242
[58] Field of Search ................... 358/34, 65, 74, 171, 358/172, 242

[56] References Cited

U.S. PATENT DOCUMENTS

| 3,582,545 | 6/1971 | Thorpe | 358/171 |
|---|---|---|---|
| 3,760,099 | 9/1973 | Kong | 358/34 |
| 4,224,640 | 9/1980 | Hovens et al. | 358/242 |
| 4,293,874 | 10/1981 | Reneau | 358/171 |
| 4,370,674 | 1/1983 | Johnson et al. | 358/74 |
| 4,484,226 | 11/1984 | Parker | 358/65 |
| 4,506,292 | 3/1985 | Newton et al. | 358/34 |
| 4,547,799 | 10/1985 | Rogers, III | 358/74 |
| 4,554,578 | 11/1985 | Willis | 358/65 |

*Primary Examiner*—John W. Shepperd

[57] ABSTRACT

The present invention provides a means and method for wideband analog RGB video processing with capability for negative feedback black level control.

A wideband analog RGB video processor is provided utilizing gain control circuitry including voltage-to-current conversion circuitry so that received color video voltage component signals are converted to color video current signals for further processing. The gain control circuitry also amplifies the component signals as desired and may provide desirable customer contrast control. Once the component video signals have been processed, they are reconverted by current-to-voltage conversion means and further amplified to provide color video voltage component signals to an output stage for driving color video displays such as CRT's. The wideband analog RGB video processor may further utilize a negative feedback circuit for stabilizing the black level and other characteristics of the video output signal. Desirably, the feedback circuit provides a correction current signal to be combined with the current component signals prior to reconversion into the video output voltage component signals. The color video voltage component signals are tapped to provide optimal feedback information for comparison with a predetermined reference signal to generate correction signals. Feedback is obtained in a coordinated fashion with the video signal so that black level information may be obtained. Capacitive storage means insure accurate correction throughout successive horizontal line intervals. Additional band width limiting capacitance is minimized by tapping the video output signal at a relatively low impedance level in the video processing stage.

16 Claims, 3 Drawing Figures

WIDEBAND ANALOG RGB VIDEO PROCESSOR WITH NEGATIVE FEEDBACK CAPABILITY AND BLACK LEVEL CONTROL

BACKGROUND OF THE INVENTION

The present invention is generally directed to improvements in the color video processing art. More particularly, the present invention is directed toward providing circuitry for a widebans RGB video processor. Even more particularly, the present invention is directed toward providing circuitry for a wide band analog RGB video processor having capability for negative feedback black level control.

In television and other color video monitor applications, a color video signal typically comprises red (R), green (G), and blue (B) components. A received signal typically may be separated into R, G and B components, amplified and then applied to appropriate R, G and B inputs of a cathode ray tube (CRT) color display terminal for visual display. Also, gain, contrast and sometimes black level controls commonly may be provided for customer adjustment of the displayed video signal.

Various applications, including those in which computers contain drive circuits that interface with CRT display devices, create the desirability for the amplifying, or RGB video processing, stage to operate efficiently and accurately through a wide band of video frequencies which may be encountered. Accordingly, it may be desirable to provide a wideband RGB video processor for use in color televisions and color video monitors.

However, efforts to provide a wide band RGB processor may frequently be frustrated by an undesired limiting effect on the signal slew rate caused by the relatively large voltage swings in a typical video signal.

Further, it may be desirable to provide feedback control circuitry for video monitors for stabilizing the black level of the video display and overcoming other signal distortions which may be incurred during RGB processing. The desired stabilizing would take into account such variations as may be induced by the gains control circuit, or temperature fluctucations, and other extraneous variations which may be induced by component value fluctuations. Optimally accurate feedback information would then be desired so as to compensate as nearly as possible for all distortions which may occur during the RGB processing.

Thus, a principal object of the present invention is to generally overcome deficiencies which exist in the prior art and to provide an improved RGB video processor.

It is a further object of the present invention to provide a wideabnd RGB video processor and RGB video processing method for color television and color video monitor applications without limiting the slew rate.

It is a still a further object of the present invention to provide feedback control capability for a video monitor for stabilizing the video display signal at the video output stage.

BRIEF DESCRIPTION OF THE FIGURES

The features of the present invention are set forth with particularity in the appended claims. The invention, together with the objects and advantages thereof, may best be understood in reference to the following detailed description taken in conjunction with the accompanying drawings in which like reference numerals are used to identify like elements and of which:

DETAILED DESCRIPTION OF THE INVENTION

The present invention generally provides for an improved analog video processor having wideband characteristics. Interconnected parallel processing channels receive respective ones of individual R, G and B voltage signals. A linearizing network interconnected with each of the R, G and B channels provides a customer contrast control for the overall video signal. In a preferred embodiment, the linearizing network is interconnected with and coupled to individual gain control circuits in each processing channel. Gain control circuits in the individual processing channles amplify the received R, G and B video voltage signals and convert them to current signals for further processing. The R, G and B current signals from the gain control circuits are then combined with a correction current to drive a low input impedance amp which converts the current signals into voltage signals to provide video information to a video output stage. The output of the video output stage is then used to drive respective R, G and B cathodes for a CRT or other suitable display device.

Further, a feedback loop is provided to supply a correction current to the low input impedance amp for maintaining a desired black level on the output signal or allowing temperature compensation and other similar functions. The correction current is combined with the individual R, G or B current signals to provide a combined, corrected video component current signal which is driven into the low input impedance amplifier. The correction current is combined with the individual R, G or B current signals to provide a combined, corrected video component current signal which is driven into the low input impedance amplifier. In the feedback loop a reference signal (a voltage signal in the preferred embodiment) implements black level control of the final R, G and B video signals. The feedback signal may be taken either directly from the output of the low input impedance amp (having current-to-voltage conversion for the combined video component current signal) or from the output of the video output stage.

Figure 1:
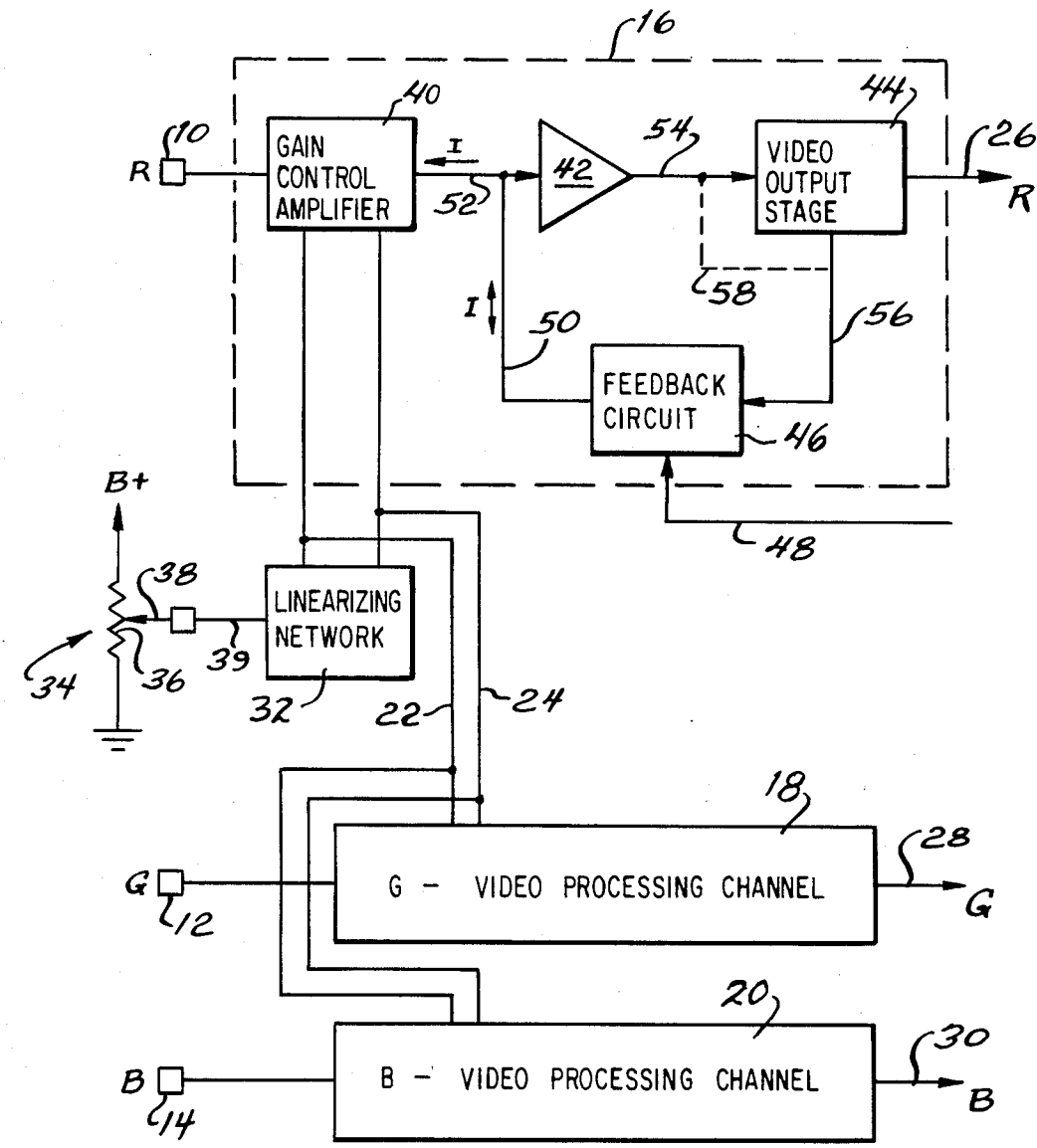
FIG. 1 is a schematic representation of a preferred embodiment of a wideband analog RBG video processor.

Referring now to FIG. 1, therein is shown a schematic representation of a preferred embodiment of a wideband analog RGB video processor. The individual R, G and B components of the color video signal are received on parallel lines 10, 12 and 14, respectively. The R, G and B signals received on lines 10, 12 and 14 are then processed by parallel video processing channels 16, 18 and 20, respectively, which are interconnected in a parallel relationship by lines 22 and 24, to produce processed R, G and B outputs on lines 26, 28 and 30, respectively. The parallel video processing channels 16, 18 and 20 are identical; accordingly, only the R component channel 16 is shown in further detail.

Also connected to the parallel lines 22 and 24 is a linearizing network 32 which is a standard circuit for an interconnecting contrast control circuit 34 with each of the video processing channels to facilitate customer control of the gain for each channel. In the embodiment illustrated in FIG. 1, the contrast control 34 comprises a potentiometer 36 connected between ground and a positive voltage with a wiper 38 coupled to the linearizing network 32 via a line 39.

More specifically, referring now to the video processing channel 16 for the R component of the color video signal, the general components of the wideband video processor of the preferred embodiment of the present invention are illustrated. In this embodiment, a gain control amplifier circuit 40 having voltage-to-current conversion capability is interconnected with a combining, low input impedance amplifier 42 having current-to-voltage conversion means. The amplifier 42 then provides a voltage signal input to a video output stage 44 which supplies the processed R video component on the line 26 as mentioned previously. Black level correction and other functions may be provided in the preferred embodiment through a feedback circuit 46 which is connected between the video output stage 44 and the amplifier 42. The feedback means 46 receives a reference signal via a line 48 and provides the appropriate current correction signal on a line 50 to be combined with the R component current signal on a line 52 at the amplifier 42. The feedback circuit 46 further includes voltage-to-current conversion circuitry for converting the output voltage video component signal to a current signal or converting a voltage feedback signal into a current feedback signal.

More particularly, as the R (or G or B components, correspondingly) is received on the line 10, the contrast control 34 (via the linearizing network 32) controls the gain provided by the gain control amplifier 40. the gain control amplifier 40 with its included voltage-to-current conversiuon means converts the voltage waveform of the R component into a current waveform which is then amplified and passed via a line 52 to the combining amplifier 42. The amplified and current-converted current signal on the line 52 is then combined with a correction current signal from the line 50. The resultant combined current signal is then converted by the amplifier 42 to provide a voltage output on a line 54 which then may be processed by the video output stage 44. The resultant processed R color video component on the line 26 is then made available as input to a cathode ray tube (CRT) or other suitable display device.

The voltage waveform output of the video output stage 44 may proivide a feedback via a line 56 to the feedback circuit 46 for further processing. Alternatively, feedback may be provided directly from the line 54 to the feedback loop and the line 56 as illustrated by a broken line 58 in FIG. 1.

In the feedback circuit 46, the voltage waveform on the line 56 is compared with a voltage reference signal on the line 48. The voltage signal is then converted to a current correction signal in the line 50 which may be combined with the R component current signal from the line 52 at the amplifier 42. Alternatively, the voltage waveform on the line 56 may be converted into a current signal and then compared with a current signal reference on the line 48 to provide the correction current desired on the line 50. In either event, the black level of the R component of the color video signal may be controlled in this fashion. Also, temperature compensation and other such functions may be provided through this feedback loop.

A preferred feedback circuit is described in detail herein. The present application also illustrates and describes a preferred video output stage. Circuitry for providing preferred adjustments in the video output stage is further described and claimed in my copending application Ser. No. 765,887, filed on the same day as the present application and entitled "Drive Adjustment Control For Video Output Stage," the teachings of which are hereby incorporated by reference.

The use of a low input impedance device such as the combining amplifier 42 allows for an extremely wideband operation. Because the signal processing occurs in terms of signal currents (instead of signal voltages), low voltage signal swing is facilitated and enhanced through the use of low input impedance, active load devices. By driving the current into and out of a low impedance, active load device, a lower band width limiting time constant can be achieved. In this fashion, the slew rate is not unduly limited and an extremely wide frequency band operation is provided.

Figure 2:
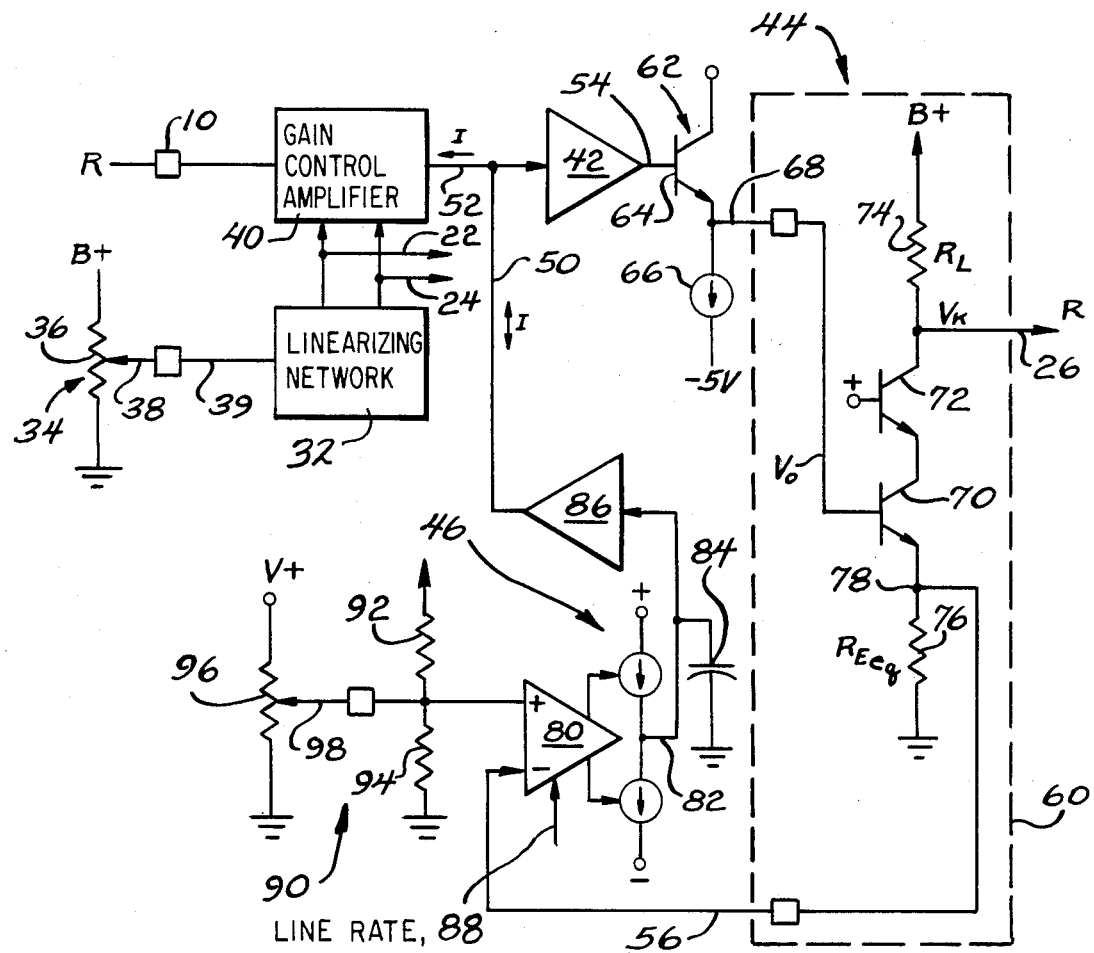
FIG. 2 is a schematic representation of a preferred embodiment of a negative feedback black level control circuit for a video monitor, including a preferred embodiment of a video output stage.

Referring now to FIG. 2, therein is shown a preferred embodiment for an improved feedback control circuit for use with the wideband analog RGB video processor disclosed herein. Also illustrated is a preferred embodiment for the output stage 44 of FIG. 1. The feeback circuit 46 of FIG. 1 is also shown in greater detail with means illustrated for providing the desired reference signal on the line 48.

More particularly, the output stage 44 comprises an output amplifier circuit 60 (shown in dashed lines) with an emitter follower, buffer amplifier 62. The emitter follower buffer 62 generally comprises a transistor 64 with a constant current source bias 66 coupled, attached to the emitter of the transistor 64. The buffered signal is then presented on a line 68 to the output amplifier 60. In FIG. 2, the signal into the output amplifier 60 on the line 68 is represented by a symbol $V_0$. $V_0$ is received by a cascode driver transistor 70 which is coupled with an output transistor 72 and a load resistor ($R_LL$) 74 and with an emitter designating resistor $R_E(eq)$ 76. The resistors 74 and 76 and the transistors 70 and 72 are connected in a cascode fashion between a positive voltage source, B+, and the ground as shown in FIG. 2. The base of the output transistor 72 is tied to a positive voltage source to maintain the transistor 72 biased in the "on" condition.

With the circuitry shown for the output amplifier 60, the output on the line 26, $V_k$, follows at an amplified level above the input voltage, $V_o$, on the line 68. Similarly, the voltage on the line 56 from a node 78 follows the input voltage $V_o$ from the line 68 and represents a low level equivalent of the output voltage, $V_k$, of the line 26. In this fashion, the cascode driver 70 operates as an emitter follower to provide a feedback signal at the node 78 to the feedback line 56. It will be appreciated by those skilled in the art that the output voltage, $V_k$, on the line 26 is related to the input voltage, $V_o$, on the line 68 based upon the relationship between the load resistor 74, $R_L$, and the emitter resistor 76, $R_E(eq)$. The following formula sets forth that relationship:

$$\frac{V_k}{V_o} = \frac{-R_L}{R_{E(eq)}} \qquad \text{(Equation No. 1)}$$

In this fashion, a feedback signal is presented on the line 56 which is representative of the output signal $V_k$ on the line 26 which is used to drive the appropriate cathode of a CRT. Feedback signals generally are not taken directly from the cathode on the line 26, because the cathode is at too high a voltage to supply feedback directly. Similarly, it is undesirable to use a voltage divider on the cathode at the line 26. Such a voltage divider would increase the capacitance at the cathode and would correspondingly limit the wideband operation of the circuit as described above.

Accordingly, the circuitry of FIG. 2 allows for the feedback signal on the line 56 to be taken directly from the output stage, but at the relatively low-level node 78. This in turn allows for the feedback circuitry to provide for stabilization in response to all the variations in the DC component of the output signal which may be induced by gain control, temperature variations, output amplification or other conditions which may occur between the initial reception of the video signal and its display at the CRT. Likewise, the high voltage at the CRT cathode is avoided.

In operation, once the feedback signal is developed on the line 56, it is transmitted to the inverting terminal at the differential amplifier 80. A reference signal is then applied to the noninverting terminal of the amp 80 so that a push-pull current signal is generated on a line 82 at the output of the differential amp 80 in conjunction with controlled current biasing means 81 and 83. The current signal on the line 82 is then representative in polarity and magnitude of the difference between the reference signal on the line 48 and the feedback signal, on the line 56.

The voltage signal on the line 82 charged or discharges a storage capacitor depending on the polarity of the differential voltage signal at the inputs of amp 80. Similarly, the voltage signal developed across the storage capacitor 84 on the line 82 is supplied to a voltage-to-current converting amplifier 86 which generates a correction current on the line 50 to be combined with the video component current signal on the line 52. The combined current signal is then driven into the low input impedance amplifier 42 to provide signal to the output stage, and thus close a feedback loop. The general feedback circuit 46 may be used to control the black level (DC component) of the video signal. Accordingly, a clocking or a gating signal is supplied on a line 88 which turns the differential amp 80 on only during the scan retrace intervals of the video signals. At that time, the video signal transmitted to the CRT comprises only the black level (DC component) signal with no video (AC component) information. Accordingly, the feedback signal on the line 56 will represent the black level voltage of the overall signal as presented to the CRT. Correspondingly, that level can then be compared to the desired black level reference voltage signal on the line 48, and a current signal of the appropriate magnitude and polarity may be generated on line 82.

Both the differential amp 80 and the voltage-to-current conversion amp 86 inputs are designed for a very high impedance level. Accordingly, once the gating pulse on the line 88 terminates, the amp 80 turns off and presents a high impedance to the storage capacitor 84. The voltage developed across the storage capacitor 84 then is stored during the succeeding horizontal video line. Because the capacitor 84 sees only high impedance, it does not significantly discharge during the horizontal line scan time interval. Correspondingly, a virtually constant correction current is generated at the output of the voltage-to-current conversion amp 86 on the line 50 for combination with the component current signal from the line 52. When the next successive scan retrace interval occurs, the black level voltage is again sampled and a new current signal generated on the line 84 which then either charges or discharges the storage capacitor 84 so that the voltage presented to the voltage-to-current conversion amp 86 for the succeeding horizontal video line will reflect the most recent information from the sampled video output.

The black level voltage reference on the line 48 may be controlled by the customer through the use of a black level signal reference circuit 90 which generally comprises a voltage divider of a pair of resistors 92 and 94 with a potentiometer 96. A wiper 98 of the potentiometer 96 varies the voltage between a positive voltage and ground as the customer may desire.

As explained above, the general circuitry of the feedback control FIG. 46 is that of a sample and hold system to correspond to the fact that the black level voltage of the video output signal is measurable only once per every scan retrace interval, on a practical basis.

The circuitry of the novel feedback black level control circuit described in conjunction with the preferred embodiment of FIG. 2 provides for greater stability in the resultant video signal. In the circuitry of the preferred embodiment, the feedback swamps out the base-to-emitter voltages which may otherwise distort the black level reference. Similarly, by controlling the voltage across the emitter resistor 76, $R_{E(eq)}$, the current through the output stage may be readily controlled. Accordingly, a sampling of the output signal for a feedback from the node 78 controls the entire output stage. Similarly, greater stability is provided in this fashion because lower temperature coefficient resistors may be used, which provide greater sensitivity and allow the feedback loop to operate more efficiently.

Figure 3:
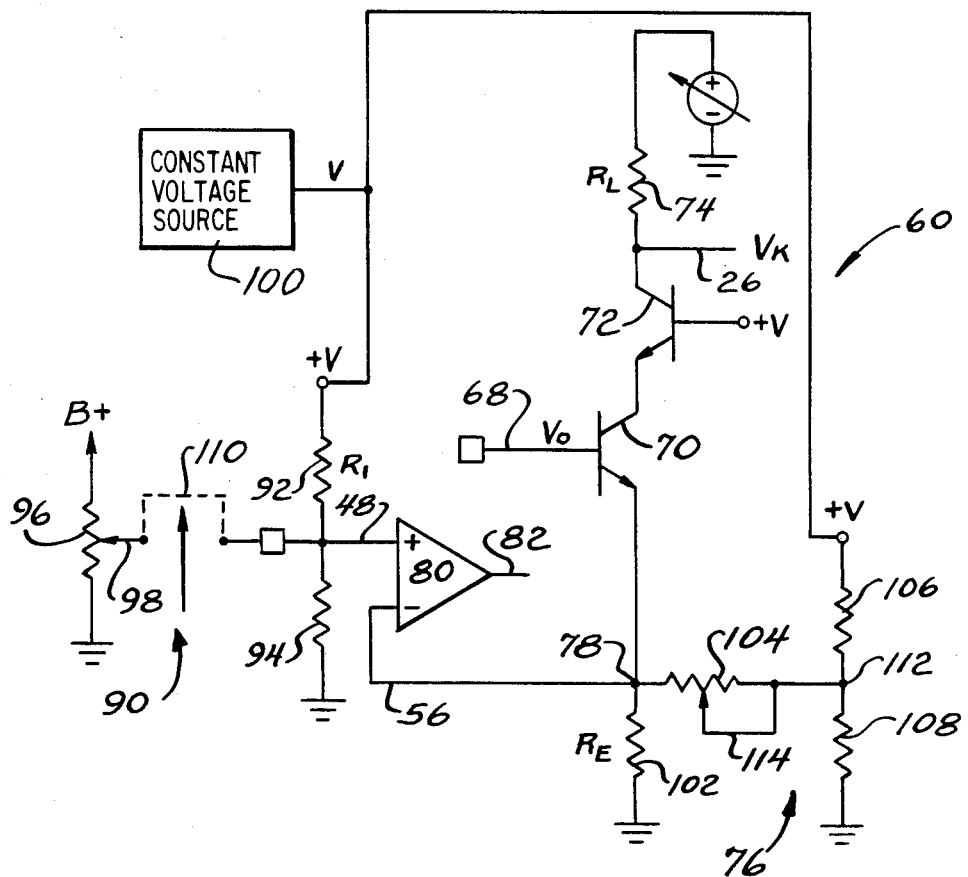
FIG. 3 is a schematic representation of a preferred embodiment of a drve adjustment control for a video output stage.

Referring now to FIG. 3, therein is shown a preferred embodiment for drive adjustment control means in the video output stage 60. The circuitry of FIG. 3 represents a slightly different configuration of the same elements of the output stage 60 coupled to the feedback circuit means of FIG. 2. As illustrated, the emitter resistance 76 of FIG. 2 comprises an emitter resistor 102 coupled by means of a potentiometer 104 to the common node of a voltage divider comprising a pair of resistors 106 and 108. The high end of the voltage divider network of the resistors 106 and 108 is tied to a constant voltage source 100 which is also tied to the high end of the voltage divider network of the resistors 92 and 94 in the black level signal reference circuit 90 of the feedback circuitry. Similarly, the line 82 at the output of the amplifier 80 represents the same line 82 as in FIG. 2 where it is coupled with the storage capacitor 84 and the conversion amplifier 86. The $V_o$ input on the line 68 at the transistor 70 represents the same line 68 signal as illustrated in FIG. 2, whereby the feedback circuit is completed from the line 82 to the line 68 as illustrated in FIG. 2.

Selective variation in the white level, or AC amplitude, of the video output signal on the line 26 may be provided by means of the drive adjustment control circuitry of FIG. 3. More particularly, a jumper 110 removes the potentiometer 96 from the black level signal reference circuit 90. Accordingly, the voltage at the noninverting input of the differential amp 80 on the line 48 will be determined by the voltage divider network of the resistors 92 and 94. As mentioned above, the positive voltage from a controlled voltage source 100, which is tied to the high end of the voltage divider network of the resistors 92 and 94, is also tied to the high end of a voltage divider network of a pair of resistors 106 and 108. In the preferred embodiment of the present invention, the resistors 106 and 108 are selected to provide a voltage at a node 112 which is equal to the voltage present on the line 48 when the jumper 110 has been removed.

As explained in conjunction with the explanation of the feedback circuitry of FIG. 2, the voltage on the line 56 and hence the voltage at the node 78 is desirably stabilized at the black level signal reference on the line 48 during the nonvideo intervals of each horizontal scanning line. Accordingly, at those times, the voltage at the node 78 should be equal to the voltage on the line 48, and, correspondingly, to the voltage at the node 112 when the jumper 110 is removed.

Because the voltage on the node 78 is equal to the voltage on the node 112, during drive level adjustment there will be no voltage drop across the potentiometer 104. Accordingly, a wiper 114 of the potentiometer 104 may be varied without affecting the current drawn through the output stage 60. Thus, although the current through the output stage 60 is not affected by changing the potentiometer 104, the equivalent emitter resistance 76 is varied. This provides the desired adjustment in the pulse amplitude of the output signal $V_k$ on the line 26 as given by equation No. 1 above.

Hence, the white level, AC amplitude, of the video output signal on the line 26 may be varied effectively without increasing the DC current through the output stage 60. Consequently, the black level of the signal is unaffected as it is controlled through the feedback circuit described above. Accordingly, adjustment may be made in the AC drive level of the video output signal on the line 26 to compensate for individual characteristics and peculiarities of individual CRT display terminals. For example, the different phosphorous content of CRT terminals may be overcome and the desired white level ratio achieved by means of the circuit. Once the white level (AC) of the video output signal is adjusted, the jumper 110 may be replaced. The circuitry will then operate as described above in conjunction with the feedback circuitry of FIG. 2.

Because it is likely that the video drive level will need to be adjusted only once as the RGB video processor and CRT terminal are typically dedicated, the jumper 110 and the potentiometer 104 need not be customer accessible controls. Adjustment need be made only once at the factory level. Hence, no additional costs are incurred providing external control for customers, yet a desired video drive level adjustment is achieved at the output stage 60.

The voltage-to-current and current-to-voltage conversions utilized in the preferred embodiment of the present invention may be accomplished in any acceptable fashion. Circuits to perform these functions are readily available and will not be described further at this point. However, it is desirable that such circuits carefully maintain the integrity of the video information during the conversion from component video voltage signals into component video current signals and back.

The circuitry of the preferred embodiment of the present invention also may be utilized to carry out a method of RGB video processing in accordance with the present invention. More particularly, as R, G and B component video voltage signals are received, they are converted to R, G and B component video current signals and amplified to provide a desired gain. Once the component video current signals have been amplified, they are driven into a low input impedance device which reconverts the component video current signals into component video voltage signals for driving the appropriate R, G and B inputs of a video display device.

Additionally, a feedback signal may be used to coordinate the output component video voltage signals with the received signals. More particularly, a feedback signal may be taken either from the output of the low input impedance combining circuit 42 or the video output circuit 44. The feedback signal is then compared with a reference signal to produce a correction current signal. The correction current signal is then combined with the component video current signals and converted into component video voltage signals for driving video display devices.

In this fashion, the component signals supplied to the video display device represent a combination of the amplified, received component video signals and the feedback information. As mentioned previously, the feedback information may be reflective of temperature compensation or black level adjustment or other desired function. Also, as the feedback is accomplished through the combination of a correction current signal with the appropriate component video current signal driven into a low input impedance device, wideband operation is facilitated and the signal slew rate is not unduly affected.

In both the method and apparatus of the present invention, the individual component video channels may be isolated. Although only one overall contrast control is illustrated in the preferred embodiment, each R, G and B processing channel could be individually controlled to vary the gain of each independently of the others. Similarly, each feedback loop may be operated independently if desired, for example, the black level on the R video component may be varied independently of the G and B components. Alternatively, of course, the overall black level of the video output signal may be controlled by supplying a single reference signal on the line 48 to each of the video component channels 16, 18 and 20.

Although described above in terms of a preferred embodiment, the present invention is set forth with particularity in the appended claims. Such modifications as would be apparent to one skilled in the art and familiar with the teachings of the present invention are deemed to fall within the scope of the appended claims.

What is claimed is:

1. A wideband analog RGB video processor comprising:

gain control means including voltage-to-current conversion means for converting recieving color video voltage component signals to color video current component signals and amplifier means for adjustably amplifying said color video current component signals;

current-to-voltage conversion means for converting said amplified color video current component signals to color video voltage component signals for use with driving color video display means, said conversion means including combining means for combining said amplified video current component signals with correction current signals;

video output circuit means for amplifying said color video voltage component signals and outputting said amplified signals to drive color video display means and having at least one node at which a relatively low voltage level signal typically is present; and feedback means coupled to receive said voltage level signal and a reference signal to process said signals and to provide said correction current signals, and adapted to receive a periodic gating signal corresponding to the scan retrace intervals during which video is not present to control the operation of said feedback means.

2. The wideband analog RGB video processor of claim 1 wherein said combining means comprises a low input impedance device.

3. The video processing system of claim 1 wherein said feedback means comprises:
reference signal means for providing a reference signal:
comparator means adapted to receive a signal representative of said color video voltage component signal and coupled to said reference signal means to receive said reference signal, said comparator means producing a differential signal representative of the difference between the compared signals; and
correction signal means coupled to said comparator means to receive said differential signal to produce a correction signal which is representative of the magnitude and polarity of said differential signal.

4. The system of claim 3 wherein said signal reference means is adjustable to provide variable, determinable reference signals.

5. The system of claim 3 wherein said comparator means and said correction means are high impedance devices and further including:
signal storage means coupled to recieve said differential signal to store a correction voltage derived from said differntial signal between said gating signals and provide said differential signal to said correction signal means during the time interval between said gating signals.

6. The system of claim 5 wherein said signal storage means comprises a storage capacitor.

7. A method for providing wideband analog RGB processing comprising:
converting receiver R, G and B component video voltage signals into R, G and B component video current signals;
amplifying said R, G and B component video current signals to provide a desired gain;
converting said amplified R, G and B component video current signals into R, G and B component video voltage signals;
amplifying said R, G and B component video voltage signals to generate R, G and B output signals for driving video display means;
providing a feedback signal from a low voltage signal representative of said R, G and B component video voltage signals soleley during scan retrace intervals during which video is not present;
comparing said feedback signal with a reference signal to generate a variable DC correction current;
combining said correction current with said R, G and B component video current signals before said conversion of said R, G and B component current video signals into R, G and B video voltage signals.

8. The method of claim 7 wherein individual R, G and B feedback signals are provided, whereby individual correction currents are generated for each R, G or B video component signal.

9. A wideband analog RGB video processor comprising:
gain control means including, voltage-to-current conversion means for converting received individual R, G and B voltage signals into individual R, G and B current signals and amplifying means coupled to said conversion means for providing desired gain for individual R, G and B current signals;
combining means for combining said individual R, G and B current signals with individual correction current signals, said combining means including current-to-voltage conversion means for converting said combined individual R, G and B current signals to produce voltage signals;
video output means coupled to said combining means for producing individual R, G and B output signals to drive desired color video display means and having at least one node at which a relatively low voltage level signal representative of said R, G and B output signals typically is present; and
feedback means coupled to said low voltage node to provide a feedback signal for coordinating said output voltage signals with said individual R, G and B current signals, said feedback means including voltage-to-current conversion means for providing individual R, G and B correction current signals and signal reference means, whereby the individual R, G and B current correction signals may be controlled by adjusting said signal reference, said feedback means is controlled by periodic gating signals corresponding to a scan retrace interval during which video is not present.

10. The wideband analog RGB video processor of claim 9 further comprising:
linearizing means for interconnection with said plurality of gain control means for received individual R, G and B signals; and
control means coupled to said linearizing means to provide overall contrast control to each of said individual R, G and B signals.

11. The wideband analog RGB video processor of claim 9 wherein said feedback means is a coupled to receive the output of said combining means.

12. A video processing system having a video output stage, including output driver means having at least one node at which a relatively low voltage level signal representative of the output voltage signal is typically present, and combining means for combining component video current signals with correction current signals for wideband RGB processing and having a feedback control means for providing optimum correction current signals comprising:
voltage reference signal mans for providing a voltage reference signal;
comparator means coupled to said low level node in said output stage and to said voltage reference means for comparing said representative output voltage signal at said low level voltage with said voltage reference signal to produce differential voltage signal representative of the difference between the compared signals;
voltage-to-current conversion means for providing a correction current signal to said combining means, the magnitude and polarity of said correction current signal being representative of said differential voltage signal;

said comparator means being adapted to receive periodic gating signals corresponding to scan retrace intervals during which no video is present to control said comparator means, whereby said low level, representative output voltage signal is compared to said voltage reference signal by said comparator means only during said scan retrace interval.

13. The system of claim 12 wherein said voltage signal reference means of said feedback control means is adjustable to provide variable, determinable voltage reference signals.

14. The system of claim 12 wherein said comparator means and said voltage-to-current conversion means of said feedback control means are high impedance devices and further including:

signal storage means coupled to receive said differential voltage signal to store a correction voltage derived from said differential voltage signal between said gating signals and provide said differential voltage signal to said voltage-to-current conversion means between said gating signals 15. In a wideband RGB video processing system utilizing video components current signals for signal processing and video component voltage signals for output and having a video output stage, an improved feedback control circuit for providing correction current signals comprising:

variable voltage reference signal means for providing variable, determinable voltage reference signals;

gated comparator means coupled to said output stage to receive low voltage output signals and coupled to said voltage reference signal means for receiving said variable voltage reference signals and adapted to receive a gating pulse signal corresponding to the scan retrace interval during which no video is present in the video signal to compare said low voltage representative video component output signals to said variable voltage reference signals only during said scan retrace interval to produce a correction voltage signal representative of the difference between the compared signals;

voltage to current conversion means coupled to recieve said differential voltage signal for providing a correction current signal, the magnitude and polarity of said correction current signal being representative of said differential voltage signal; and combining means for combining said correction current signal with said video component current signals.

16. The improved feedback control circuit of claim 15 wherein said comparator means and said voltage-to-current conversion means are high impedance devices and further including:

signal storage coupled to receive said differential voltage signal to store a correction voltage signal derived from said differential voltage signal between said gating signals and provide said correction voltage signal to said voltage-to-current conversion means between said gating signals.

* * * * *